July 7, 1970     C. P. WOOD, JR     3,518,884

MAGNETIC THERMOMETER MOUNTING STRUCTURE

Filed Nov. 21, 1968     3 Sheets-Sheet 1

INVENTOR.
Charles P. Wood Jr.
BY Wood, Herron & Evans
ATTORNEYS

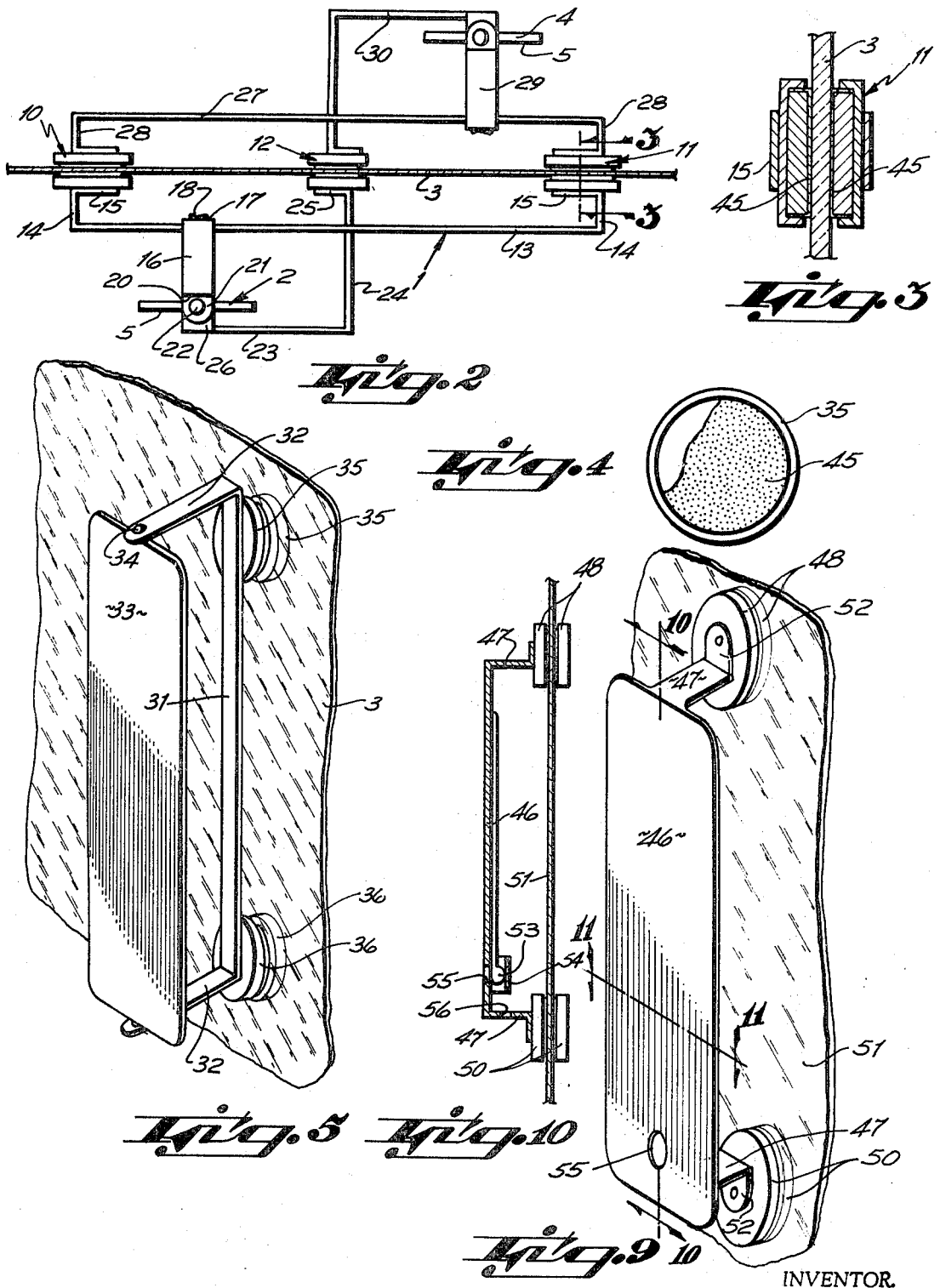

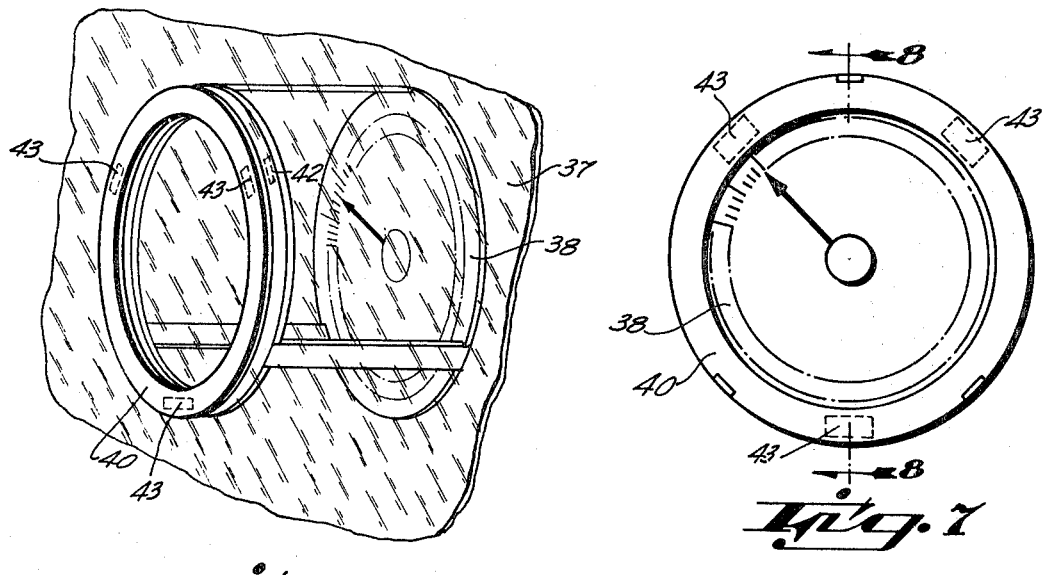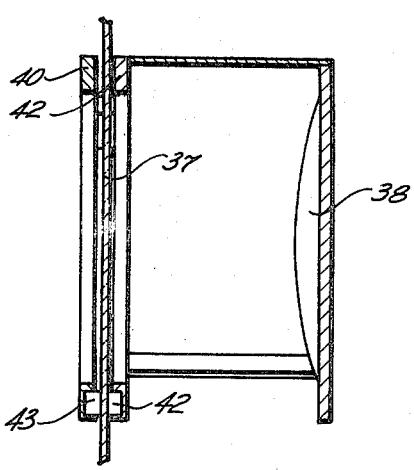

United States Patent Office 3,518,884
Patented July 7, 1970

3,518,884
MAGNETIC THERMOMETER MOUNTING STRUCTURE
Charles P. Wood, Jr., Cincinnati, Ohio, assignor to Midwest Research & Development Corporation, Cincinnati, Ohio, a corporation of Ohio
Filed Nov. 21, 1968, Ser. No. 777,823
Int. Cl. G01k *1/14*
U.S. Cl. 73—374
6 Claims

ABSTRACT OF THE DISCLOSURE

A magnetic mounting structure for thermometers, whereby an outside thermometer may be mounted in spaced relation to a window glass so as to provide an indication of the outside temperature from the inside of the building. The mounting structure comprises a bracket for supporting a thermometer with reference to a window glass but at a sufficient spacing therefrom to prevent the temperature reading from being influenced by the heat inside the building. The mounting bracket is secured with reference to the window glass by means of pairs of magnets of opposed polarity which are seated against opposite sides of the window glass so as to secure the bracket, and the thermometer which is attached thereto, to the window glass without requiring holes to be drilled through the glass or other attachment means.

BACKGROUND OF THE INVENTION

The invention relates generally to thermometers which indicate the air temperature both inside and outside of a building. More particularly, the invention is directed to a magnetic mounting structure by means of which an outside thermometer may be magnetically mounted with reference to a window glass, such that the outside temperature may be viewed from inside the building in a convenient manner, with a second thermometer, also magnetically mounted, to indicate the inside temperature.

One of the primary objectives of the invention has been to provide a permanent magnetic mounting structure utilizing pairs of magnets of opposed polarity mounted upon opposite sides of a window glass, with a mounting bracket mechanically attached to the pairs of permanent magnets so as to support the inside-outside thermometers or temperature indicators with reference to the glass panel without requiring mechanical attaching means such as suction cups or the drilling of holes through the glass panel.

According to this aspect of the invention, as applied to an outside thermometer, there is provided a bracket having two or more permanent magnets for supporting the thermometer or temperature indicator. Each magnet includes a companion magnet of opposed polarity, the arrangement being such that, as applied to an outside thermometer, one magnet of each companion pair resides to the outside of the glass panel while the companion pair, of opposite polarity, resides on the opposite side of the glass panel and provides magnetic attraction so as to clamp the mounting bracket of the thermometer to the glass panel.

A further objective has been to provide a magnetic mounting bracket by means of which an outside thermometer and an inside thermometer are mounted magnetically in spaced relationship with reference to a window glass on opposite sides of the window glass to provide a temperature reading within the building and outside the building for comparison purposes.

According to this aspect of the invention, a bracket structure is provided which utilizes pairs of companion magnets of opposed polarity, the bracket constituting two sections, one disposed on the interior side of the glass panel and the other disposed to the exterior side of the glass panel. The brackets for the inside and outside of the glass panel are substantially in duplicate but symmetrically opposite in design. The brackets are arranged to support an inside thermometer and an outside thermometer, both equally spaced from the glass panel and displaced laterally, the arrangement being such that a true temperature reading is obtained without being influenced by the inside or outside temperatures. The inside and outside brackets are secured together in clamping engagement against the opposite sides of the glass panel by the individual sets of companion magnets of opposed polarity.

A further objective of the invention has been to provide an improved magnet, preferably disc-shaped, which includes a facing providing frictional engagement with the opposed surfaces of the glass panel against which the companion magnetic elements are engaged magnetically.

According to this aspect of the invention, the magnetic elements may be disc-shaped or ring-shaped, as illustrated, and as stated above, of opposed polarity. The magnetic elements may be fabricated of steel or alloy or they may be of a ceramic type. In any event, the flat face of the magnetic elements, which seat against the opposed surfaces of the glass panel, preferably are provided with a coating of anti-skid material for example, rubber or an equivalent material. Accordingly, by the attractive force of the companion magnets, combined with the frictional property of the facing, the magnets not only secure the thermometer mounting structure securely in position with respect to the glass panel but also prevent shifting of the structure along the plane of the glass panel.

DRAWINGS

FIG. 2 is a top plan view, as projected along the line 2—2 of FIG. 1, further illustrating the magnetic mounting bracket and the position of the inside and outside thermometers in relation to the window glass.

FIG. 3 is an enlarged sectional view taken along the line 3—3, detailing one of the pairs of companion magnets of opposed polarity, which clamp the mounting bracket to the opposite sides of the window glass.

FIG. 4 is a face view of one of the magnets, as viewed along the line 4—4 of FIG. 3.

FIG. 5 is a perspective view showing a modified form of the invention, as viewed from outside the building, in which a magnetically secured mounting bracket, according to the invention, is utilized in supporting a single outside thermometer with reference to the window glass.

FIG. 6 is a fragmentary perspective, as viewed from inside the building, showing a modified version in which a magnetic mounting bracket of the invention is used in supporting a dial-type thermometer in spaced relation to the window glass for indicating the outside temperature.

FIG. 7 is a face view of the modified dial type thermometer of FIG. 6, showing the thermometer and its magnetic mounting bracket as viewed from inside the building.

FIG. 8 is a sectional view of the dial type magnetic thermometer mounting structure as indicated along the line 8—8 of FIG. 7.

FIG. 9 is a perspective view showing another modified form of the invention which embodies a one-piece U-shaped mounting bracket and backing for the thermometer.

FIG. 10 is a longitudinal sectional view of the modified structure taken along the line 10—10 of FIG. 9.

FIG. 11 is a cross-sectional view taken along the line 11—11 of FIG. 9, further detailing the modified structure.

GENERAL DESCRIPTION

Figure 1:
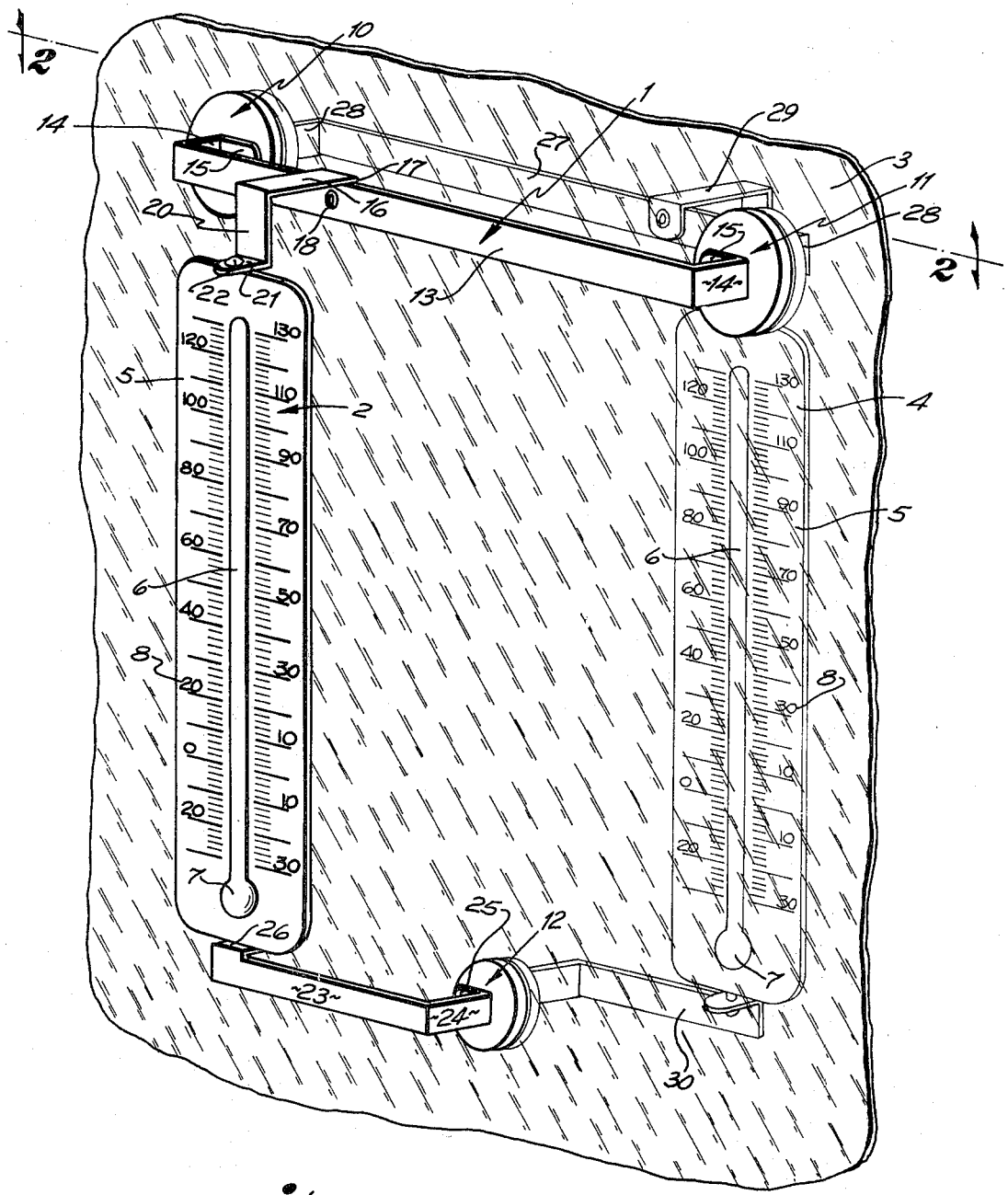
FIG. 1 is a fragmentary perspective view illustrating the magnetic mounting bracket for supporting the inside and outside thermometers with reference to a window glass.

As noted earlier, the invention relates generally to the concept of providing a thermometer which may be attached magnetically to a window glass to indicate the outside temperature. One of the main objectives, as noted earlier, has been to provide a bracket arrangement for supporting the thermometer in spaced relation to the window glass to indicate the correct outside temperature. For this purpose, the magnetic mounting structure is arranged to support the outside thermometer a sufficient distance from the window glass to allow free flow of outside air to circulate around the thermometer. A shielding arrangement is provided about the outside thermometer bulb to isolate the thermometer from the room temperature which may otherwise influence the reading due to heat radiation through the glass.

Generally speaking, the magnetic mounting bracket shown in FIGS. 1 and 2 illustrates the magnetic mounting bracket of the invention supporting an inside thermometer and an outside thermometer mounted upon opposite sides of a window glass. The bracket is arranged to support the thermometers in spaced relation laterally from one another so that the inside and outside temperatures may be read in a convenient manner from inside the building.

In the embodiment of the invention shown in FIG. 5, the magnetic mounting bracket is illustrated in relation to an outside thermometer, utilizing the principle of magnets of opposed polarity disposed in magnetic attraction with reference to the opposite sides of the window glass.

The modified structure illustrated in FIGS. 6–8 further illustrates the principles of the invention. In this embodiment, as explained later in detail, a dial type thermometer is mounted in spaced relationship to the window glass by means of pairs of magnetic rings, as distinguished from the magnetic discs. The dial type thermometer is held in spaced relationship to the window glass by a suitable bracket, as described later.

It will be understood from the following description that the same magnetic principle, that is, of mounting the thermometer with the use of magnets of opposed polarity, magnetically engaging the opposite sides of a glass panel or window light, prevails in the several modifications of the invention as disclosed herein. In each instance, permanent magnets, either in the form of mating discs or rings, are utilized to magnetically grip the opposite sides of a glass panel so as to secure an inside and outside thermometer to the window glass or to secure a single thermometer (usually of the exterior type) to the window glass.

In the several variations of the invention disclosed herein, utilizing pairs of magnets of opposed polarity, the principle of the invention, that is of magnetically gripping the glass panel or window glass on its opposite sides is utilized. In addition, as described in detail later, the paired magnets include a non-skid surface which inhibits slippage of the magnets and the thermometer mounting brackets.

INSIDE-OUTSIDE THERMOMETER MOUNTING STRUCTURE

Described generally with reference to FIGS. 1–3, the magnetic mounting bracket for the inside-outside thermometer is indicated generally at 1 and supports the inside thermometer, indicated generally at 2, within the building, spaced inwardly from the window glass 3. The magnetic bracket 1 supports the outside thermometer 4 to the exterior of the window glass, also in spaced relation to the glass 3 so as to indicate the correct outside temperature. In this example of the invention, the interior and exterior thermometers 2 and 4 are of the conventional glass tube type, each constituting a backing plate 5 having a vertical thermometer tube 6, the lower end of the glass tube having a bulb 7 containing mercury or an equivalent expansible fluid which indicates the temperature with reference to the indicia 8 carried by the backing plate 5.

It will be understood at this point, that the inside thermometer 2 and the outside thermometer 4 are both spaced outwardly from the window glass a sufficient distance to isolate the thermometer from the glass, thereby to provide correct temperature readings without being influenced by the transmission of heat through the window glass.

Described in detail with reference to the outside-inside mounting, the magnetic bracket on both sides of the glass is in duplicate, and as an assembly, is magnetically secured to the window glass by three pairs of magnets, indcated generally at 10, 11 and 12. The pairs of magnets 10–12, as described later in detail, are of opposed polarity and are magnetically engaged against the opposite sides of the window glass 3 to support the bracket, previously indicated at 1.

Described in detail, the inside bracket (FIGS. 1 and 2) comprises a bridge piece 13 spanning the two inside magnets 11 and 12. The bridge piece is generally U-shaped, having opposed limbs 14—14, spacing the bridge piece 13 inwardly from the window glass 3. The ends of the limbs 14 each include an inturned foot 15, bent at right angles to the limbs 14 and in facial engagement with the disc-shaped permanent magnets 10 and 12.

The upper end of the inside thermometer 2 is connected to the bridge piece 13 by a right angular bracket 16 having a foot 17 riveted or otherwise secured as at 18 to the bridge piece 13 (FIGS. 1 and 2). The bracket 16 projects inwardly from the bridge piece 13 and includes a downwardly depending arm 20, including a foot 21 riveted or otherwise secured as at 22 to the upper end of the backing plate 5 of the inside thermometer 2.

The lower end of the inside thermometer 2 is supported by the magnet 12 by means of a bracket 23 mechanically connected to magnet 12. Bracket 23 includes a right angular leg 24 having a foot portion 25 seated against and secured to the lower magnet 12. The opposite end of bracket 23 includes a foot 26 secured preferably by a rivet (not shown) to the lower end of the backing plate 5, as previously indicated at 22 with reference to the upper end of the backing plate. It will be understood that the lower bracket 23 spaces the lower end portion of the thermometer backing plate 5 from the window glass a distance equal to the spacing provided by the upper bridge piece 13, such that the backing plate and thermometer are held in spaced parallelism with the window glass 3.

It will be noted in FIG. 1, that the opposed magnets 10, 11 and 12 are arranged in a triangular pattern, the upper magnets 10 and 11 forming the base while the lower opposed magnets 12 describe the apex of the triangle. As described later in detail, the pairs of opposed magnets are of opposite polarity and are faced with an anti-skid surface to provide a frictional engagement with the glass panel 3 to prevent slippage.

The bracket 1 which mounts the outside thermometer 4 is identical to the bracket for the inside thermometer 2 except that it is symmetrically opposite in order to space the outside thermometer 4 laterally from the inside thermometer 2 for convenience in reading the outside temperature through the window glass 3. Described generally (FIGS. 1 and 2), the outside thermometer 4 is supported by a bridge piece 27 having limbs 28—28, similar to the limbs 14—14, and having a similar length to space the outside thermometer 4 from the window glass 3. The upper end of the outside thermometer 4 is secured to the outside bridge piece 27 by a right angular bracket 29, similar to the bracket 16, so as to space the outside thermometer 4 from the window glass 3 a distance equal to the spacing of the inside thermometer 2. The opposite ends of the bridge piece are mechanically connected to the opposed magnets of the upper pair 10 and 11.

The lower end of the backing plate 5 of the outside thermometer is supported by the bracket 30, which is similar to the bracket 23, excepting that it also is symmetrically opposite to bracket 23 so as to space the outside thermometer 4 laterally from the inside thermometer 2. The bracket 30 has its inner end mechanically connected to the opposed magnet of the pair 12, as described earlier, and its opposite outer end riveted to the lower end of the backing plate 5 of the outside thermometer 4.

OUTSIDE THERMOMETER MOUNTING STRUCTURE

The outside thermometer mounting structure illustrated in FIG. 5 utilizes the same principle disclosed with reference to the inside-outside thermometer mounting illustrated in FIGS. 1 and 2. In this example of the invention, there is provided a generally U-shaped bracket 31 having horizontal limbs 32—32 projecting outwardly from the glass panel 3. The backing plate 33 of a conventional tube-type thermometer is secured to the outer ends of the limbs 32 by means of rivets 34—34. The parallel limbs 32—32 thus support the backing plate and its thermometer (not shown) in parallelism and spaced outwardly from the window glass 3 a sufficient distance to provide a reliable temperature reading free from influence by the interior room temperature. In this version of the invention, pairs of magnets 35—35 and 36—36, having opposed polarity, are mechanically secured to the opposite end of the U-shaped bracket 31, with the mating magnets located at the opposite sides of the glass panel 3 so as to clamp the bracket 31 and the backing plate 33 of the outside thermometer to the glass panel 3.

In this form of the invention, the rivets 34—34 which connect the opposite ends of the backing plate 33 to the limbs 32 provide a pivotal connection. The purpose of this arrangement is to permit the backing plate 33, with its thermometer, to be rotated at an angle with reference to the mounting bracket 31. This permits the outside thermometer to be mounted at any convenient point on the window glass, whereby it may be observed at a desired angle from inside the room.

DIAL TYPE MAGNETIC MOUNTING STRUCTURE

Referring to FIGS. 6, 7 and 8, there is illustrated a dial-type thermometer, of conventional design, which is magnetically mounted with reference to the window glass 37. In this modification of the invention, the dial-type thermometer, indicated at 38, is supported by a pair of ring-shaped magnet assemblies, indicated at 40 and 41, disposed on the opposite sides of the glass panel 37. The ring-shaped magnet assemblies 40 and 41 may be formed of a plastic material and each includes, in the present example, several magnetic elements. Thus the inside ring-shaped magnetic assembly 40 includes three magnetic elements indicated at 42, while the outside ring-shaped magnetic assembly 41 includes three matching magnetic elements indicated at 43. The magnetic elements 42 and 43 are spaced about the rings at equal distances and are arranged to register with one another.

It will be understood that the magnetic elements 42 and 43 are of opposed polarity so as to provide an attractive force, thus clamping the opposed magnetic rings to the opposite sides of the glass panel 37.

The dial-type thermometer 38 is supported with reference to the glass panel 37 by means of three arms 44 which project outwardly from the outside magnetic ring assembly 41. The arms 44 may be formed of metal and the opposite ends of the arms are secured to the external ring 41 and to the periphery of the dial-type thermometer 38 in any conventional manner.

As stated earlier, the opposed magnets, that is the disc-type magnets 10–12 and the ring-type magnets 40 and 41, if formed of metal or any other hard alloy or plastic material, may have a tendency to slip downwardly with reference to the smooth surface of the glass panel against which the elements are magnetically clamped. In order to avoid this problem, the surfaces of the opposed magnets may be provided with frictional facing, for example, rubber, plastic, or other equivalent material, as indicated at 45 (FIGS. 3, 4 and 7) to provide frictional engagement with the smooth surface of the glass panel.

MODIFIED OUTSIDE THERMOMETER MOUNTING

The outside thermometer assembly shown in FIGS. 9, 10 and 11 is somewhat similar to the structure shown in FIG. 5. However, in this example, the structure utilizes a one-piece bracket which acts as a combined thermometer backing plate and magnetic mounting bracket.

Described in detail, the modified structure comprises a thermometer backing plate 46, the upper and lower ends of which are provided with right angular limbs 47—47. Pairs of magnets 48—48 and 50—50, of opposed polarity, secure the thermometer assembly to the window glass 51. The outside magnet of each pair is mechanically secured to the foot portion 52 of the upper and lower limbs.

In order to prevent the radiant heat from inside the building from reaching the thermometer bulb 53 (FIGS. 10 and 11), there is provided a curved shield 54 (FIGS. 10 and 11) secured to the backing plate 46 and enclosing the bulb. The backing plate 46 includes an opening 55 communicating with the shield 54 to admit the outside air to the bulb 53 within the shield 54. A second hole 56 (FIG. 10) may be formed in the lower limb 47 to permit the outside air to flow upwardly across the thermometer bulb from below.

Having described my invention, I claim:

1. A magnetic thermometer mounting structure for supporting a pair of thermometers in spaced relation to window glass comprising:

a first bracket arranged to reside adjacent a window glass on the exterior thereof;

said first bracket having a connecting member comprising a bridge piece which is generally U-shaped;

said U-shaped bridge piece having limbs projecting generally at right angles from the opposite ends of the bridge piece and spacing the bracket from the window glass;

each of said limbs including a foot portion bent at right angles to the limbs;

a first set of permanent magnets secured to the said right angular foot portions, said magnets seated against the exterior surface of the window glass;

a second bracket arranged to reside adjacent the window glass to the interior thereof opposite to the said first bracket;

said second bracket having a connecting member comprising a bridge piece which is generally U-shaped;

said U-shaped bridge piece having limbs projecting generally at right angles from the opposite ends of the bridge piece and spacing the bracket from the window glass;

each of said limbs including a foot portion bent at right angles to the limbs;

a second set of mating permanent magnets of opposed polarity secured to the said right angular foot portions and seated upon the opposite surface of said window glass in registry with the first set of said permanent magnets, whereby the opposed magnets are held in pressure engagement against the opposite sides of the said window glass by magnetic attraction;

an outside thermometer secured to the said first bridge piece in spaced relation to the said window glass, the spacing of the outside thermometer being sufficient to avoid influence of the temperature reading by the window glass;

and an inside thermometer secured to the second bracket and residing in spaced relation to the inside of the window glass to indicate the air temperature on the inner side of the window glass.

2. A magnetic thermometer mounting structure for supporting a pair of thermometers in spaced relation to a window glass comprising:
- a first bracket arranged to reside adjacent a window glass to the outside thereof;
- said first bracket having a connecting member comprising a bridge piece which is generally U-shaped;
- said U-shaped bridge piece having opposed limbs projecting generally at right angles from the opposite ends of the bridge piece and spacing the bracket from the window glass;
- the free ends of said spaced limbs including a foot bent generally at right angles to the limbs and parallel with the bridge piece;
- a first set of outside permanent magnets secured to the right angular foot portions of said limbs;
- a second bracket arranged to reside against the inside of the window glass opposite to the said first bracket;
- said second bracket having a connecting member comprising a bridge piece which is generally U-shaped;
- said second-U-shaped bridge piece having limbs projecting generally at right angles from the opposite ends of the bridge piece;
- and spacing the bracket from the window glass;
- the free ends of said limbs including a foot portion bent at right angles to the limbs;
- a second set of mating permanent magnets of opposed polarity secured to the said right angular foot portions arranged to be seated against the opposite side of the window glass in registry with the first set of said permanent magnets, whereby the pairs of magnets provide a magnetic gripping force engaged against the opposite sides of the window glass;
- an outside thermometer secured to the said first bridge piece in spaced relationship to said window glass, the spacing of the outside thermometer being sufficient to avoid influence of the temperature reading by the window glass;
- bracket means having an end secured to the lower end of the outside thermometer;
- a third outside permanent magnet mechanically secured to the inner end portion of the bracket means;
- a mating third inside permanent magnet disposed in registry with the third outside magnet and disposed on the opposite side of the window glass;
- an inside thermometer having an upper end secured to the inside bracket;
- said third magnets being of opposed polarity and providing a magnetic gripping force against the opposite sides of the window glass;
- the lower end of said inside thermometer secured to the said inside permanent magnet in spaced relationship to the glass panel, whereby the thermometers are supported by the three point magnetic gripping force provided by the said three pairs of outside and inside magnets.

3. A magnetic mounting structure for a thermometer for supporting a pair of thermometers in spaced relation to a window glass comprising:
- a first bracket arranged to reside adjacent a window glass to the outside thereof;
- said first bracket having a connecting member comprising a bridge piece which is generally U-shaped;
- said U-shaped bridge piece having opposed limbs projecting generally at right angles from the opposite ends of the bridge piece and spacing the bracket from the window glass;
- the free ends of said spaced limbs including a foot bent generally at right angles to the limbs and parallel with the bridge piece;
- a first set of outside permanent magnets secured to the right angular foot portions of said limbs;
- a second bracket arranged to reside against the inside of the window glass opposite to the said first bracket;
- said second bracket having a connecting member comprising a bridge piece which is generally U-shaped;
- said second U-shaped bridge piece having limbs projecting generally at right angles from the opposite ends of the bridge piece;
- and spacing the bracket from the window glass;
- the free ends of said limbs including a foot portion bent at right angles to the limbs;
- a second set of mating permanent magnets of opposed polarity secured to the said right angular foot portion arranged to be seated against the opposite side of the window glass in registry with the first set of said permanent magnets, whereby the pairs of magnets provide a magnetic gripping force engaged against the opposite sides of the window glass;
- an outside thermometer secured to the said first bridge piece in spaced relation to said window glass, the spacing of the outside thermometer being sufficient to avoid influence of the temperature reading by the window glass;
- outside bracket means having an end portion secured to the lower end of the outside thermometer;
- a third outside permanent magnet mechanically secured to the inner end portion of the outside bracket means;
- inside bracket means having an end portion secured to the lower end of the inside thermometer;
- a mating third inside permanent magnet mechanically secured to the inner end portion of the inside bracket means and disposed in registry with the third outside magnet on the opposite side of the window glass;
- the lower end of said inside thermometer secured to the said bracket means in spaced relationship to the glass panel, whereby the thermometers are supported by the three point magnetic gripping force provided by the said three pairs of outside and inside magnets.

4. A magnetic mounting structure for supporting a thermometer relative to a window glass comprising:
- a first bracket arranged to reside adjacent the surface of a window glass in a generally horizontal position;
- a first pair of permanent magnets secured to the said opposite ends of said first bracket;
- a second bracket arranged to reside against the window glass opposite to the said first bracket in a generally horizontal position;
- a second pair of permanent magnets of opposed polarity secured to the opposite ends of the second bracket and arranged to reside against the opposite surface of the window glass in registry with the said first pair of holding magnets, whereby the two pairs of holding magnets provide a gripping force against opposite sides of the window glass sufficient to mount the said brackets thereon;
- a thermometer having an upper end portion secured to the first bracket;
- means secured to the lower portion of the thermometer and including a third permanent holding magnet seated against the surface of the window glass;
- and means connected to the second bracket including a matching third permanent magnet of opposite polarity seated against the opposite surface of the window glass, said magnets being in registry and thereby providing a three point magnetic gripping force for holding the thermometer relative to the surface of the window glass.

5. A magnetic mounting structure for supporting a thermometer relative to a window glass comprising:
- a first bracket arranged to reside adjacent the surface of a window glass in a generally horizontal position;
- a first pair of permanent magnets secured to the said opposite ends of said first bracket;
- a second bracket arranged to reside against the window glass opposite to the said first bracket in a generally horizontal position;
- a second pair of permanent magnets of opposed polarity secured to the opposite ends of the second bracket and arranged to reside against the opposite surface of the window glass in registry with the said first pair of holding magnets, whereby the two pairs of holding magnets provide a gripping force against opposite sides of the window glass sufficient to mount the said brackets thereon;

a thermometer having an upper end portion secured to the first bracket;

means secured to the lower portion of the thermometer and including a third permanent holding magnet seated against the surface of the window glass;

means connected to the second bracket including a matching third permanent magnet of opposite polarity seated against the opposite surface of the window glass, said matching third magnets being in registry;

at least one magnet of each of said pairs of permanent holding magnets including a facing arranged to seat against the window glass, said facing providing a frictional engagement with the surface of the glass, thereby providing a three point magnetic gripping force for holding the thermometer relative to the surface of the window glass.

6. A magnetic mounting structure for supporting a thermometer relative to a window glass comprising:

a first bracket arranged to reside adjacent the surface of a window glass;

said first bracket being generally U-shaped and providing a generally horizontal bridge piece having limbs projecting generally at right angles from opposite ends of the bridge piece, thereby spacing the bracket from the window glass;

each of said limbs including mounting means at the outer end portions thereof for mounting a permanent magnet thereon;

a first pair of permanent holding magnets secured to the said mounting means of the said limbs and seated against the window glass;

a second bracket arranged to reside against the window glass opposite to the said first bracket;

mounting means on said second bracket for mounting a second pair of matching permanent holding magnets thereto;

a second pair of permanent magnets of opposed polarity secured to the mounting means of the second bracket and arranged to reside against the opposite surface of the window glass in registry with the said first pair of holding magnets, whereby the two sets of holding magnets provide a gripping force against opposite sides of the window glass sufficient to mount the said brackets thereon;

a thermometer having an upper end portion secured to the bridge piece of the first bracket;

means secured to the lower portion of the thermometer and including a third permanent holding magnet seated against the surface of the window glass;

and means connected to the second bracket including a matching third permanent magnet of opposite polarity seated against the opposite surface of the window glass, said matching third magnets being in registry and thereby providing a three point magnetic gripping force for holding the thermometer in spaced relationship to the window glass.

References Cited

UNITED STATES PATENTS

| | | | |
|---|---|---|---|
| 2,634,444 | 4/1953 | Coleman | 248—206 |
| 2,964,947 | 12/1960 | De Jong | 73—343 |
| 3,177,717 | 4/1965 | Oveson | 73—374 |
| 3,264,970 | 10/1966 | Hersh et al. | 248—206 |

LOUIS R. PRINCE, Primary Examiner

W. A. HENRY II, Assistant Examiner

U.S. Cl. X.R.

248—206